United States Patent [19]
Bertram et al.

[11] Patent Number: 6,073,136
[45] Date of Patent: Jun. 6, 2000

[54] MOBILE COMPUTER WITH MINIMIZED FUNCTION DISPLAY AND MAXIMIZED CONTENT DISPLAY

[75] Inventors: Randal Lee Bertram, Raleigh; David Frederick Champion, Durham, both of N.C.

[73] Assignee: International Business Machines Corporation, Armonk, N.Y.

[21] Appl. No.: 08/960,914

[22] Filed: Oct. 30, 1997

[51] Int. Cl.$^7$ .................................................. G06F 17/30
[52] U.S. Cl. .................... 707/104; 707/501; 707/513; 345/339; 345/341; 345/346
[58] Field of Search .................... 707/501, 513, 707/104; 345/341, 346, 352–357; 709/217, 218

[56] References Cited

U.S. PATENT DOCUMENTS

| | | | |
|---|---|---|---|
| 5,835,092 | 11/1998 | Bourdeau et al. | 345/347 |
| 5,878,276 | 3/1999 | Aebli et al. | 395/839 |
| 5,890,172 | 3/1999 | Borman et al. | 707/501 |
| 5,893,110 | 4/1999 | Weber et al. | 707/104 |
| 5,933,841 | 8/1999 | Schumacher et al. | 707/501 |

*Primary Examiner*—Hosain T. Alam
*Attorney, Agent, or Firm*—Bernard D. Bogdon

[57] ABSTRACT

A display generating or computer system, and particularly a mobile client system, in which a markup language browser application program is provided which minimizes the display area occupied by the navigational tools of the browser, in order to maximize the informational display area related to a user's task at hand. The browser application is simplified in order to accommodate ease in learning to use the browser.

33 Claims, 9 Drawing Sheets

MOBILE COMPUTER WITH MINIMIZED FUNCTION DISPLAY AND MAXIMIZED CONTENT DISPLAY

RELATED APPLICATIONS

This application document is one of a series of related applications assigned to common ownership. Other applications and documents in the series include:

U.S. Pat. No. 5,878,276, entitled "Handheld Computer Which Establishes an Input Device as Master over the CPU When it Is Coupled to the System;"

U.S. Pat. No. 5,864,340, entitled Mobile Client Computer Programmed to Predict Input,"

U.S. Pat. No. 5,805,159, entitled "Mobile Client Computer Interdependent Display Data Fields;"

U.S. Pat. No. 5,964,847, entitled Mobile Client Computer Interacting with Docking Device;"

U.S. Pat. No. 5,805,158, entitled "Copying Predicted Input Between Computer Systems;"

U.S. Pat. No. 6,008,810 entitled "Mobile Client Computer Programmed for System Message Display;"

U.S. Pat. No. 5,905,486, entitled "Mobile Client Computer Programmed to Combine Cursor, Control and Input Functions;"

U.S. Pat. No. 5,923,861, entitled "Mobile Client Computer Programmed to Display Drop Down Scrolling Indicator;" and U.S. Pat. No. 5,790,118, entitled "Mobile Client Programmed to Hide Empty Table Elements."

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are the personal computer systems offered by IBM and identified as the PERSONAL COMPUTER AT, PERSONAL SYSTEM/2, PS/1, Aptiva, and the like. Persons of skill in the computer arts will be familiar with these systems.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models originally used the popular INTEL 8088 or 8086 microprocessor as the system processor. These processor have the ability to address one megabyte of memory. The Family II models typically used the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. As the state of the art has progressed, Family I systems have developed toward ever higher capability central processor units, including the Intel PENTIUM brand microprocessor and its competitors, Reduced Instruction Set Computing (RISC) microprocessors such as the IBM and Motorola Power PC processors, and higher capability bus designs such as VESA and PCI bus designs. Again, persons of skill in the computer arts will be familiar with these systems.

The impact of such development on the manner in which computing is done in business and consumer environments has been profound. Prior to the development of personal computer systems, most use of computers was for business purposes only and data processing was done in the "glass house" which housed the computer system. Inquires were channeled through information managers for handling by computer technicians. With the wide spread use of personal computer systems access to data once maintained on an enterprise wide computer system became important to managers and ultimately line employees. Networks of personal computer systems grew up, with layered access through network servers to the enterprise systems or mainframes on which enterprise data is stored.

As information work has spread to an increasing number of information workers and impacted the work of more wide spread groups of employees within an enterprise, need for mobility of such employees has arisen. Particularly in such "outside" jobs as route salesperson, transport driver, or business consultant, it has become important to have access, while remote from an enterprise site, to enterprise data normally maintained on an enterprise system and accessed through a network of computer systems. Such access has been achieved, in part, through the use of wireline connected personal computer systems such as notebook or laptop computer systems. Typically, such a system may be equipped with a modem and communications software such that, when connected to a public switched telephone network (PSTN), the system may be connected with a supporting server or mainframe and a user may gain access to desired data.

With the development of radio communications such as exemplified by the cellular telephone networks, the possibility arose of eliminating the wireline connection between a personal computer system and a supporting server. Such systems have been developed, particularly for systems used in retail and warehousing businesses, which permit a user to move freely within an area which has radio transceiver service while remaining in intermittent or continuous contact with a data channel through which data may be exchanged with a server or mainframe supporting an enterprise activity. For purposes of discussion here, such systems in the hands of user will be referred to as "mobile client systems". A mobile client system is distinguished by the mobility of the user, who is free of the restraints against movement imposed by a wireline connection, and by the client nature of the system in that enterprise data accessed by the mobile client system is maintained on a server or mainframe computer system with which the mobile client is in communication. Such mobile client systems are also sometimes referred to as personal communications assistants or personal digital assistants. The interested reader is referred to "Wireless: The Revolution in Personal Telecommunications" by Ira Brodsky (Artech House, Boston, 1995) for additional background and information about mobile client systems.

One use for a mobile client system is to gain access to resources available through the World Wide Web (also known by the initials WWW). Such access is obtained, with a more widely used desktop client system, through application programs known as browsers. Existing WWW browsers place all major browsing functions on the screen or in the available display area. This includes frequently used functions such as "Back" and "Home" and seldom used functions such as "Find" (a string of text) and "Open". The screens also commonly include horizontal and vertical scroll bars, a document title and/or URL field, a status line to show any download progress, and a menu bar and title bar.

This screen clutter causes problems in limited display area devices such as a mobile client system. On a small screen, or in a limited display area, there is not enough room for all the browsing controls and indicators. Further, even in large display areas as typically available for a full screen display on a desktop client system, the current screen arrangements are inappropriate for novice users. In vertical markets, such as those where mobile client systems are first finding usefulness, more and more users are novice or unsophisticated computer users who are using WWW browsers for internal company webs (or "intranets"). Such users, here also called "simple users", follow a repetitive work flow designed by systems specialists, relying primarily on hyperlinks for navigation. The sophisticated navigational tools of existing browsers can confuse simple users. Additionally, the prospect of a high rate of turnover among such users contributes to the need for a system which is quickly and easily learned.

SUMMARY OF THE INVENTION

With the foregoing as background, the present invention contemplates a mobile client system in which a WVVW browser application is provided which minimizes the display area occupied by the navigational tools of the browser, in order to maximize the informational display area related to a user's task at hand. In realizing this purpose, the smaller display areas typically available in a mobile client system are used to better advantage.

Additionally, the present invention contemplates a display system, such as a mobile client system, in which a browser application is simplified in order to accommodate ease in learning to use the browser.

It is to be noted that organizations using both desktop and mobile client systems have need of a browser application which addresses the concerns of mobile users while avoiding limitations in so doing. As an example, a browser that works well on the limited display area of a mobile client device should also take good advantage of the larger display area of a desktop client system, because the organization may use both types of systems. Additionally, the browser which is easy for a simple user to learn should still retain the functionality which will be required by the organizations "power users" who are sophisticated in use of computers.

BRIEF DESCRIPTION OF THE DRAWINGS

Some of the purposes of the invention having been stated, others will appear as the following description proceeds, when taken in connection with the accompanying drawings, in which.

DESCRIPTION OF THE PREFERRED EMBODIMENT(S)

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
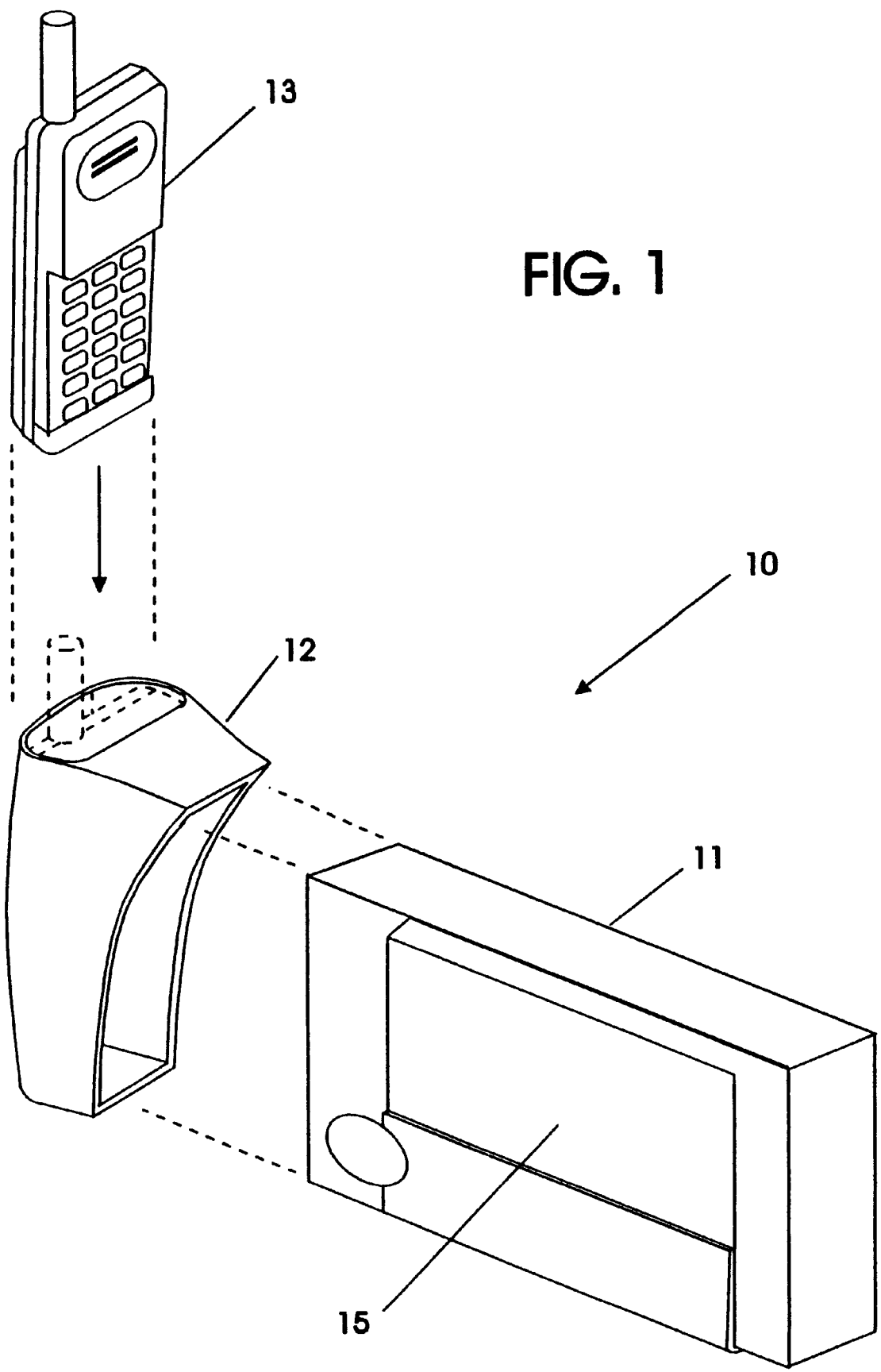
FIG. 1 is an exploded perspective view of certain elements of a mobile client computer system in accordance with this invention.
Figure 2:
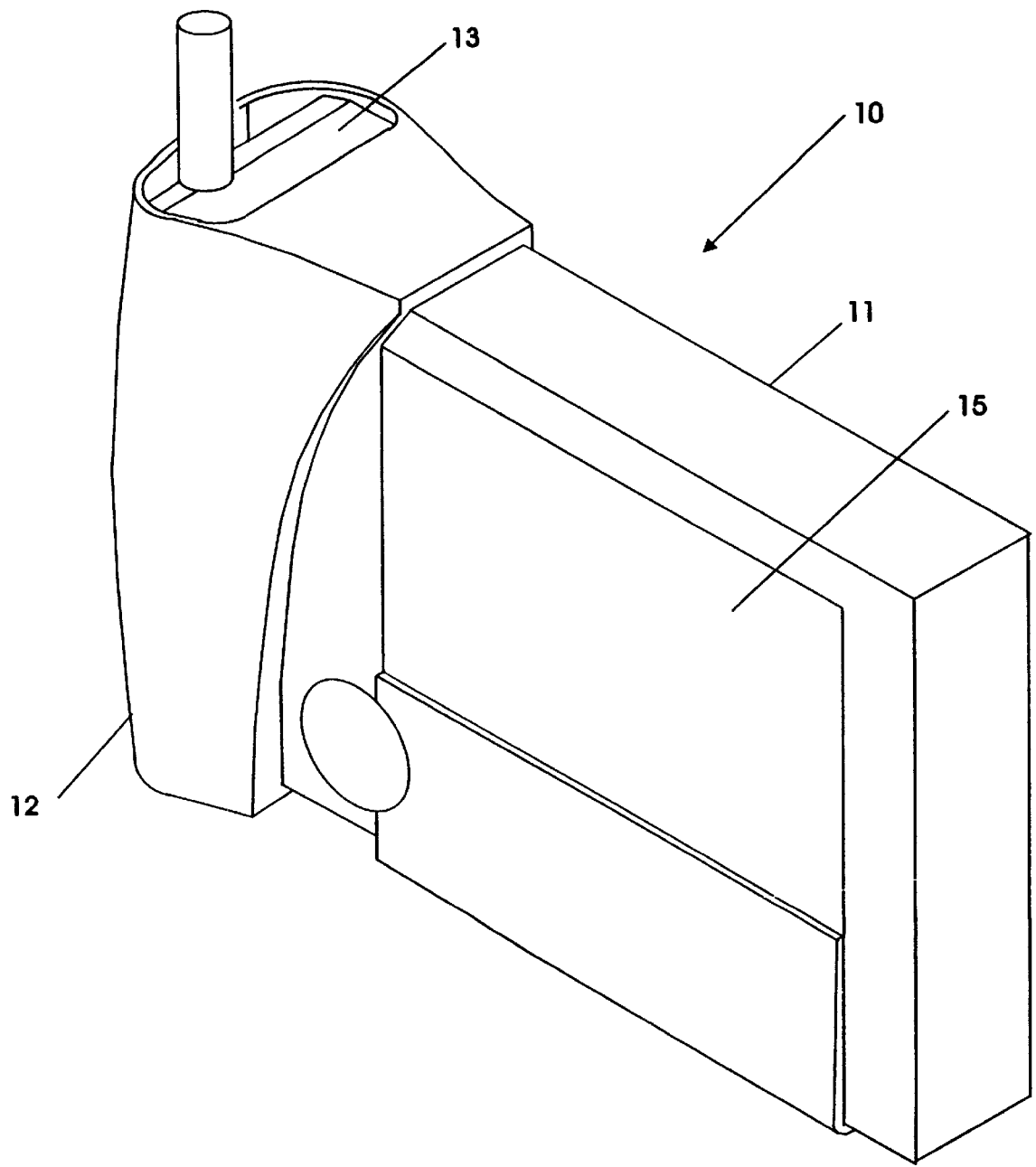
FIG. 2 is a perspective view of the mobile client system of FIG. 1 as assembled for use.

Referring now more particularly to the accompanying Figures, FIGS. 1 and 2 illustrate an exemplary embodiment of a mobile client personal computer system (herein also called a "mobile client") in accordance with this invention and indicated generally at 10. As will become more clear from the description which follows, the mobile client may have a variety of characteristics while remaining within the contemplation of this invention. Central among those characteristics is that the system have provision for the capability of communicating at least data, possibly both data and audio such as voice, between the mobile client system and supporting servers and mainframes. In the illustrated embodiment, such capability is provided by providing a system which is separable into three distinct components, namely a system tablet 11, a holster 12 and a radio transceiver 13. In the form illustrated, the transceiver 13 is a cellular telephone which may be mounted within the holster 12, while the holster 12 may be connected with the system tablet 11 by slipping the tablet into a receptacle provided in the holster 12. While thus illustrated and here described as a three component system, it will be understood that many of the advantages of this invention as described hereinafter can be realized where the mobile client system 10 is unified. That is, where the radio transceiver 13 is integrated with the system tablet 11 and the connection therebetween is accomplished within a single cover for the system, apart from any use of a holster 12. The transceiver/holster/tablet organization provides certain advantages in some circumstances. However, it is to be understood that the invention can be practiced apart from this particular organization.

An advantage realizable with the tripartite organization is the ready substitution of one radio transceiver for another.

More particularly, while digital data and analog audio can be exchanged over a cellular telephone radio interface, with data using cellular digital packet data (CDPD) protocols, there are other possibilities. Among them can be digital radio techniques such as frequency division multiple access (FDMA) and time division multiple access (TDMA); spread spectrum technologies such as direct sequence spread spectrum (DS-SS) and resultant code division multiple access (CDMA); frequency hopping spread spectrum (FH-SS); and the combination of one of more of these technologies into what are known as advanced mobile phone systems (AMPS) or advanced radio data information service (ARDIS) or RAM Mobile Data. As these technologies evolve and gain wider acceptance, the tripartite organization will facilitate adapting existing tablets 11 to emerging radio transceivers 13, and thereby protect the investment of users in systems. However, for certain environments such as adverse ambient conditions of temperature, humidity, or exposure to shock as by dropping, a unified system with transceiver and tablet and supporting circuitry in a single cover may be a preferred choice.

Figure 3:
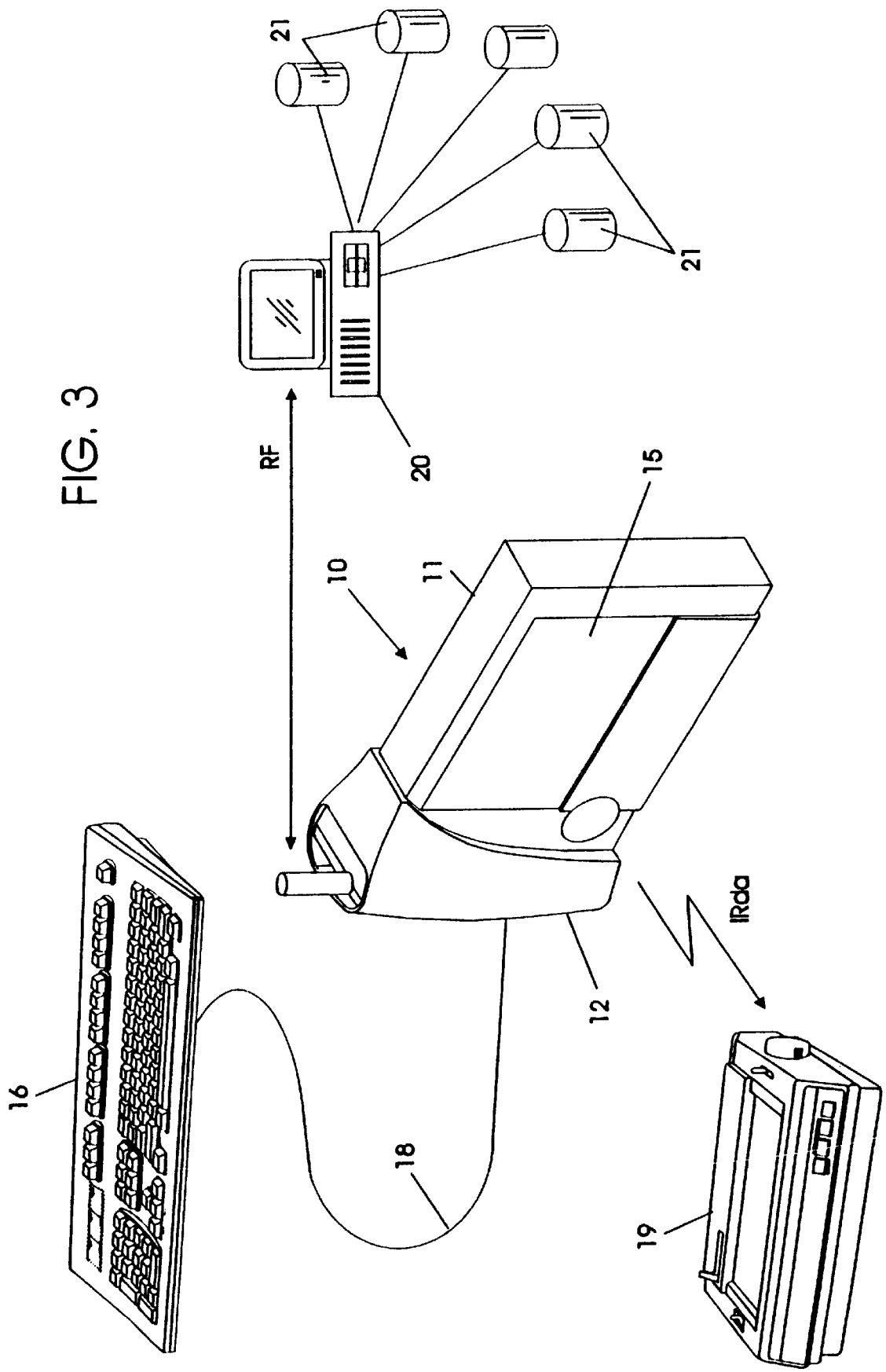
FIG. 3 is a diagrammatic representation of relationships among a mobile client system as shown in FIGS. 1 and 2 and supporting peripherals and systems.

Turning now to FIG. 3, what is there schematically indicated is the relationships among a system 10 in accordance with the invention and supporting servers and peripherals. More particularly, while the tablet 11 (as described more fully hereinafter) is normally adapted for input by a user through a touchscreen 15 embodied in a backlit liquid crystal display, the system 10 can accommodate a more conventional keyboard 16. The keyboard may be, as illustrated, wire tethered to the system 10 when desired for use, with the tethering conductors 18 providing signal pathways for data input to reach the system 10. Alternatively, the keyboard may be linked for data transfer by other means known to persons of skill in the art, such as by an infrared link using a known protocol. In the drawing, the system is shown linked to a printer 19 by an IrDA link for data transfer by infrared radiation.

As indicated above, the radio transceiver provides a radio frequency link to a server indicated at 20, which may communicate by wireline with supporting mainframe data storage 21. Data relevant to the operation of the entire enterprise will be maintained on the supporting mainframe, and made available to the mobile client 10 in accordance with this and the above identified related inventions.

Figure 4:
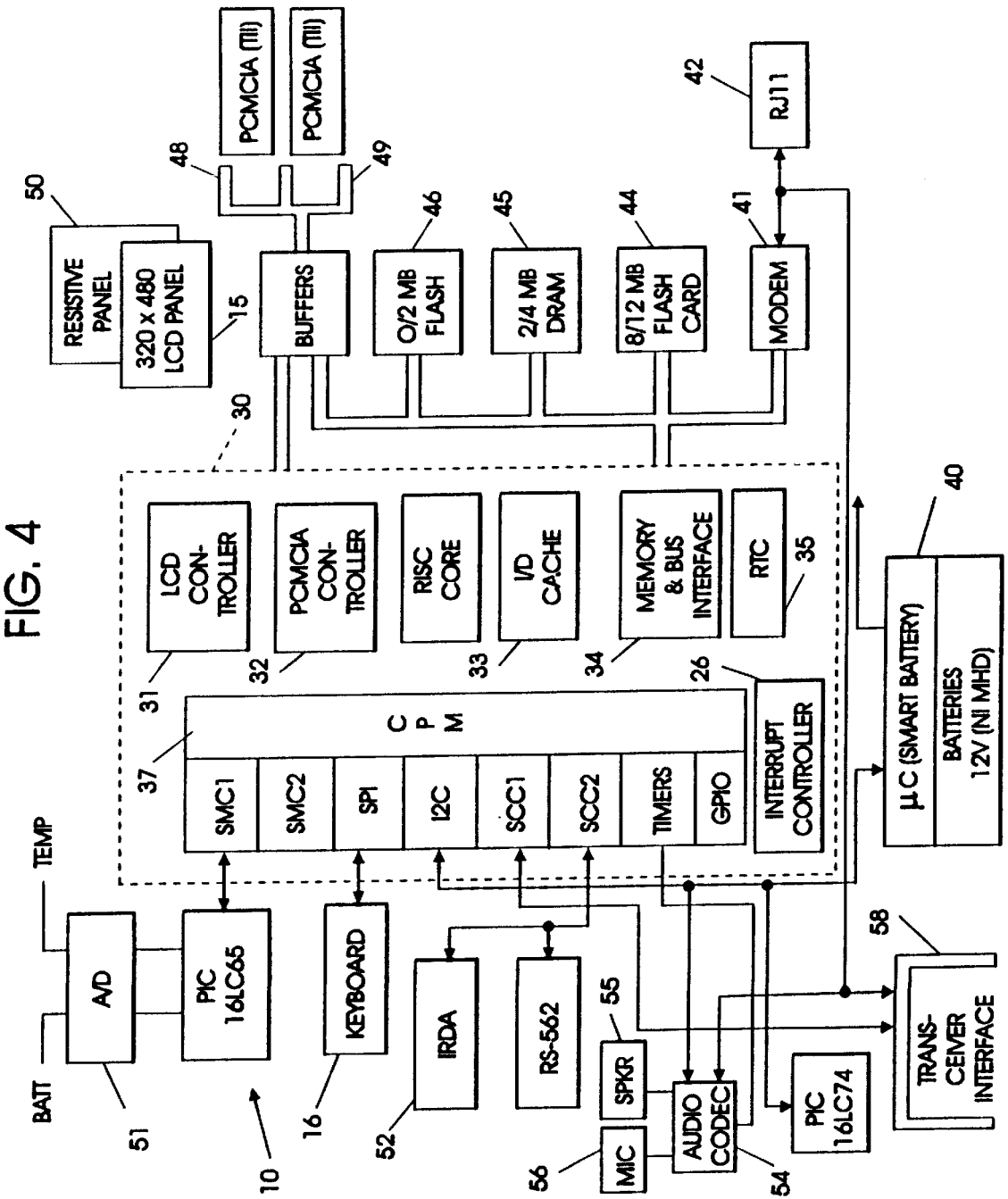
FIG. 4 is a schematic showing of certain circuitry elements embodied in the mobile client of FIG. 2.

Turning now to the circuitry elements which together accomplish the processing of data in accordance with this invention, FIG. 4 illustrates one form of organization of such elements. As there shown, the illustrated mobile client system 10 has at its core a microprocessor (indicated at 30) which uses reduced instruction set computing (RISC) characteristics, The processor has elements which include a controller 31 for a liquid crystal display; a controller 32 for peripherals of the type known as PCCards or PCMCIA cards; instruction/data cache 33; an interface to memory and an external bus 34; and a real time clock 35; The microprocessor also has an interrupt controller 36 and a defined interface for a variety of services 37. While here disclosed as a single processor chip having these characteristics, it is known from the manufacture and use of prior art computer systems that such computational capability and interface availability can be reached by other means, such as the use of an Intel X86 based processor surrounded by appropriate support logic or chips. Thus while the embodiment of FIG. 4 is offered as exemplary of a system in accordance with this invention, it is known the core functionality of such a mobile client system can be otherwise configured.

As indicated in FIG. 4, the core microprocessor 30 is supported by peripherals. Most importantly, power for operating of the system is supplied from a battery 40. Preferably, the battery 40 is of the type known as a "smart" battery, in which provision is made for self monitoring by the battery of charge state and recharge progress. Such batteries are known and will provide signals to the mobile client system processor 30 which can be used to generate indications to a user of the battery charge state, readiness for re-use after charging, etc. The mobile client also preferably has a conventional modem 41, for use when connected by wireline, and a telephone interconnection point 42 (indicated as an RJ-11 connector). Memory for the system is provided by a flash memory accessory card 44; by dynamic random access memory (DRAM) 45; and by core flash memory 46. Preferably, a pair of PCMCIA slots, of type II, are provided as shown at 48 and 49 for the addition of other functionality.

In order to display the result of data handling operations performed by the mobile client system, the system 10 has an LCD 15 as mentioned above. The LCD is overlain by a suitable touchscreen 50 which functions as a digitizer to recognize when input is made by a user. There will be further discussion of this functionality later in this description. Input from the touchscreen, as from the battery and a temperature sensor, passes through an analog/digital converter 51 to an input/output (I/O) port of the processor 30. Other I/O ports of the processor 30 provide for connection to a keyboard as described above; an IrDA port 52, an audio CODEC 54 and associated speaker 55 and microphone 56; and an interface connector 58 for the radio transceiver 13.

As was pointed out hereinabove, it is to be understood that the specific organization of functions here described with reference to FIG. 4 may be varied due to a designers choice of functions to be supported, processor core, and support logic.

As mentioned above, the mobile client system 10 obtains power from a battery. While such operation is appropriate for mobility, provision is made for support of the system 10 by connection to more conventional power sources in the form of alternating current electrical mains. Such power sources are identified at 60 in FIG. 5, to which reference is had in the following description of power management relationships. As will be understood, the management of power usage by a mobile client system is significant with regard to usability of the system.

Figure 5:
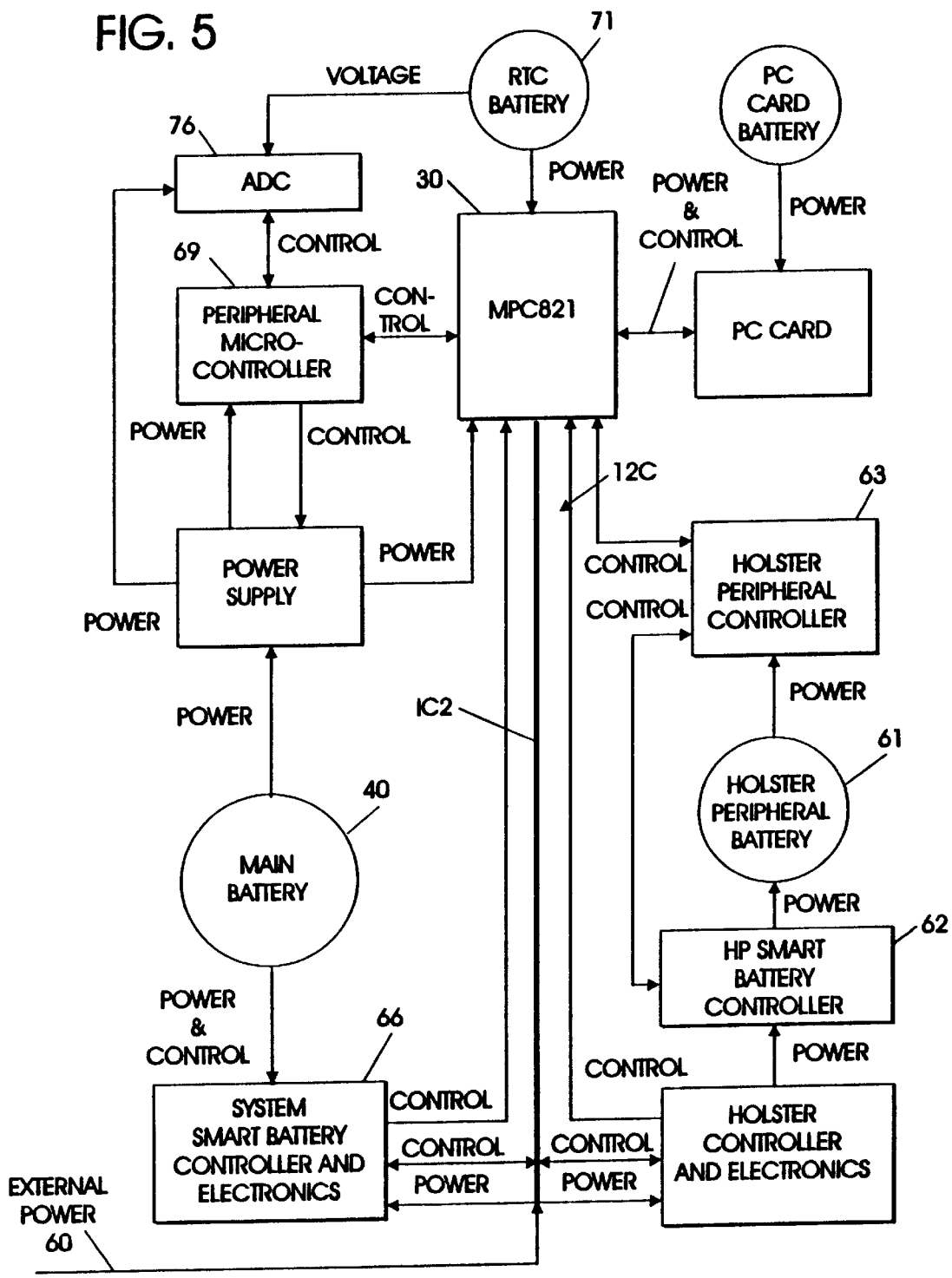
FIG. 5 is a schematic showing of certain circuitry elements and their relationships in the mobile client of FIG. 2.

FIG. 5 illustrates the organization of peripherals around the processor 30 from the perspective of power sources and consumption. The power management topology is such that power flows to the processor 30 in the tablet 11 from the main battery 40, while separate flows of power and control impact the holster 12, any radio transceiver 13 mounted in the holster, and any PCCard accessories used by the system. This division of power flows is of significance to the mobile client system 10 here described. More particularly, a separate battery 61 is provided in the holster 12. The holster battery 61 preferably is a "smart" battery, and has associated therewith in the holster 12 a battery controller 62, a holster peripheral controller 63, and associated circuitry 64 effective to interface the data streams flowing to and from the processor 30 with the radio transceiver 13. Thus, while circuitry in the holster 12 and transceiver 13 is under the control of the processor 30 (as will be pointed out more fully hereinafter), the power source is at least somewhat independent of the tablet 11. This is a significant division. When the tablet is engaged with a holster, the circuitry in the two components cooperates in management of the whole. When a transceiver 13 (which, if a conventional cellular telephone, may have its own power source and power management techniques) is positioned in the holster 12, then the transceiver 13 may also have a coordinated role in participating in power management for the tripartite system.

Turning more particularly to the tablet 11, that system will have controller circuitry 66 for the battery 40 and a power supply 68 to which the battery 40 supplies power for operation of the tablet 11. In the present system, provision is made for a separate microcontroller 69 to exercise control over the power supply in order to off-load certain requirements from the core processor 30. The microcontroller receives input from the processor 30 and from a converter 70. The processor 30 and converter 70 are supported, for minimal functions, by a battery 71 for the real time clock 35. The RTC battery 71 assures that the tablet system will wake up when called as described more fully hereinafter.

Figure 6:
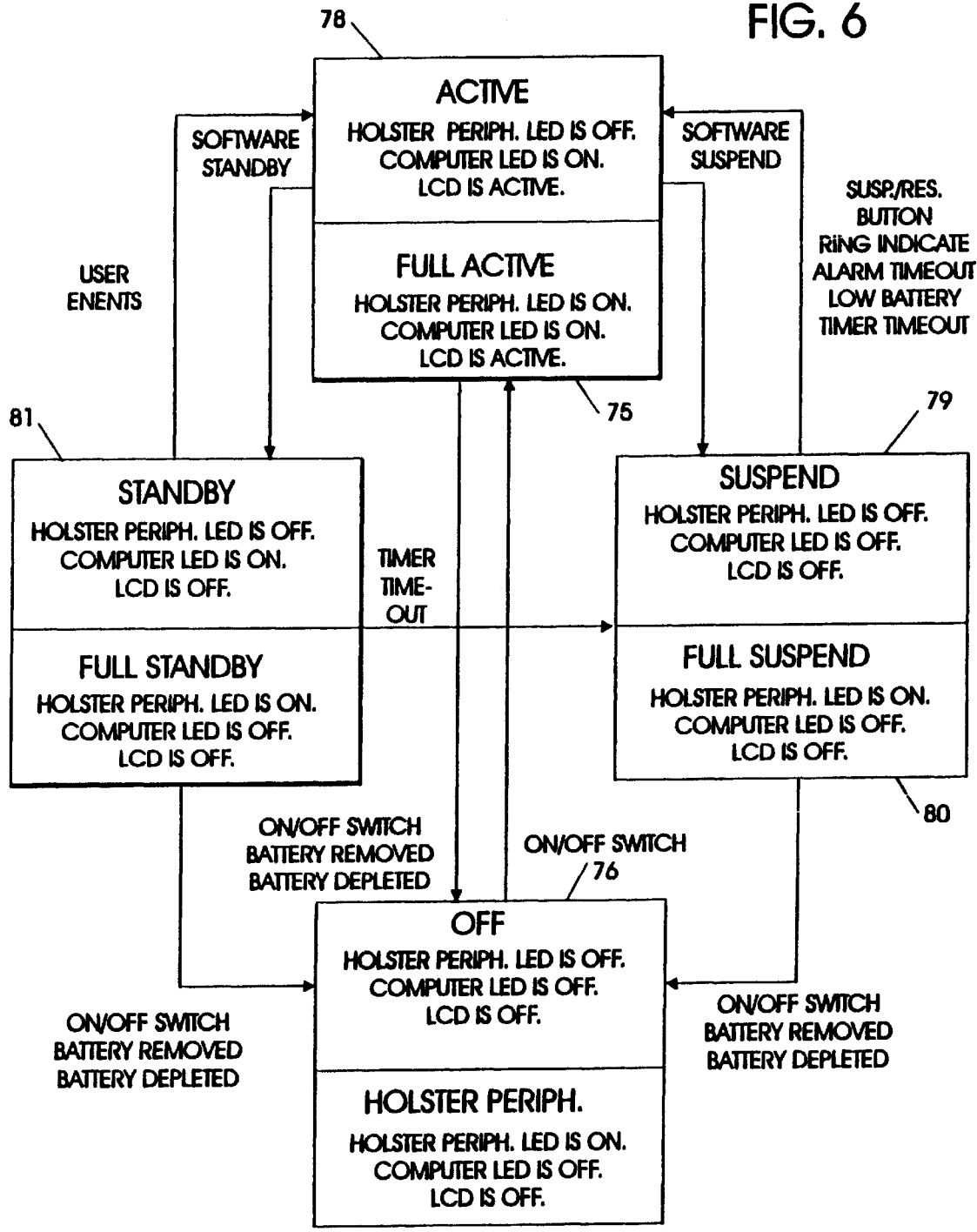
FIG. 6 is a state diagram of power modes for the mobile client of FIG. 2 and transitions among them.

Turning now from the hardware topology to a discussion of the power modes and transition events for the mobile client system 10, FIG. 6 is one illustration of such modalities. For purposes of the following description, it should be noted that a user of the mobile client system will be provided with indicators for the levels of activity of the system. Typically, such indicators or annunciators will be in the form of light emitting diodes (LEDs), as such devices are readily available, inexpensive, and known to most users of technical devices. The tripartite system may be provided with an indicator for the tablet 11, and indicator for the holster 12, and an indicator for the transceiver 13. In FIG. 6, distinctions are drawn between states of activity which reflect differing levels of activity between the tablet 11 and holster 12, and an assumption is made that the system illustrated is a tripartite system with tablet and holster joined.

With this background in mind, the fully active state of the system will have both the tablet 11 and the holster 12 fully activated as indicated by illumination of the corresponding LEDs and the backlit LCD 15. That state is indicated at 75. The completely opposite state, with all components powered down (as if when all batteries have been removed), is indicated at 76, and would result in all LEDs and the backlit LCD being unilluminated. From the state of being fully active, a user may elect to turn off the holster 12, either by operating a switch provided for that purpose or by interrupting a necessary interconnection through separating the holster from the tablet or the radio transceiver from the holster. In such an event, the tablet LED and LCD may remain illuminated (as the tablet remains active) while the holster LED becomes unilluminated (indicated at 78). The mobile client may be capable of data processing using data stored in memory, yet be disconnected (intermittently or temporarily) from the supporting servers 20 and data storage 21. Upon an occurrence determined by software executing on the mobile client system, the system may enter a state known as suspend. In the suspend state, indicated at 79, the tablet LED and LCD and the holster LED are dark. Should it be appropriate for the radio transceiver to be used while the remainder of the tripartite system remains in suspend state, then the system can enter a state indicated at 80 in which the holster LED is illuminated and the transceiver functional. Similarly, upon an occurrence determined once again by software executing on the mobile client system, the system may enter a state known as standby, indicated at 81. In standby, the tablet LCD will be darkened to save power, while the tablet LED will remain illuminated to indicate that the system can be "awakened" readily. The holster may be either powered down (with LED dark) or remain active. A timer function is provided which, after passage of a predetermined time interval with the system 10 in Standby, will transition the system to Suspend mode.

The system can transition between Off state 76 and Active states 78 or 75 by use of an on/off switch. The system can transition from any Suspend or Standby state to Off state 76 by use of the on/off switch or battery removal. The system can transition from Suspend states 79 or 80 to Active states 78 or 75 in response to a suspend/resume input from a user, an incoming call indication from the radio transceiver connected with the holster, time out of a timed interval, or a battery low charge indication from the smart battery controllers. The system can transition from Standby states to Active states 78 or 75 in response to user events such as an input by way of the touchscreen or keyboard.

Figure 7:
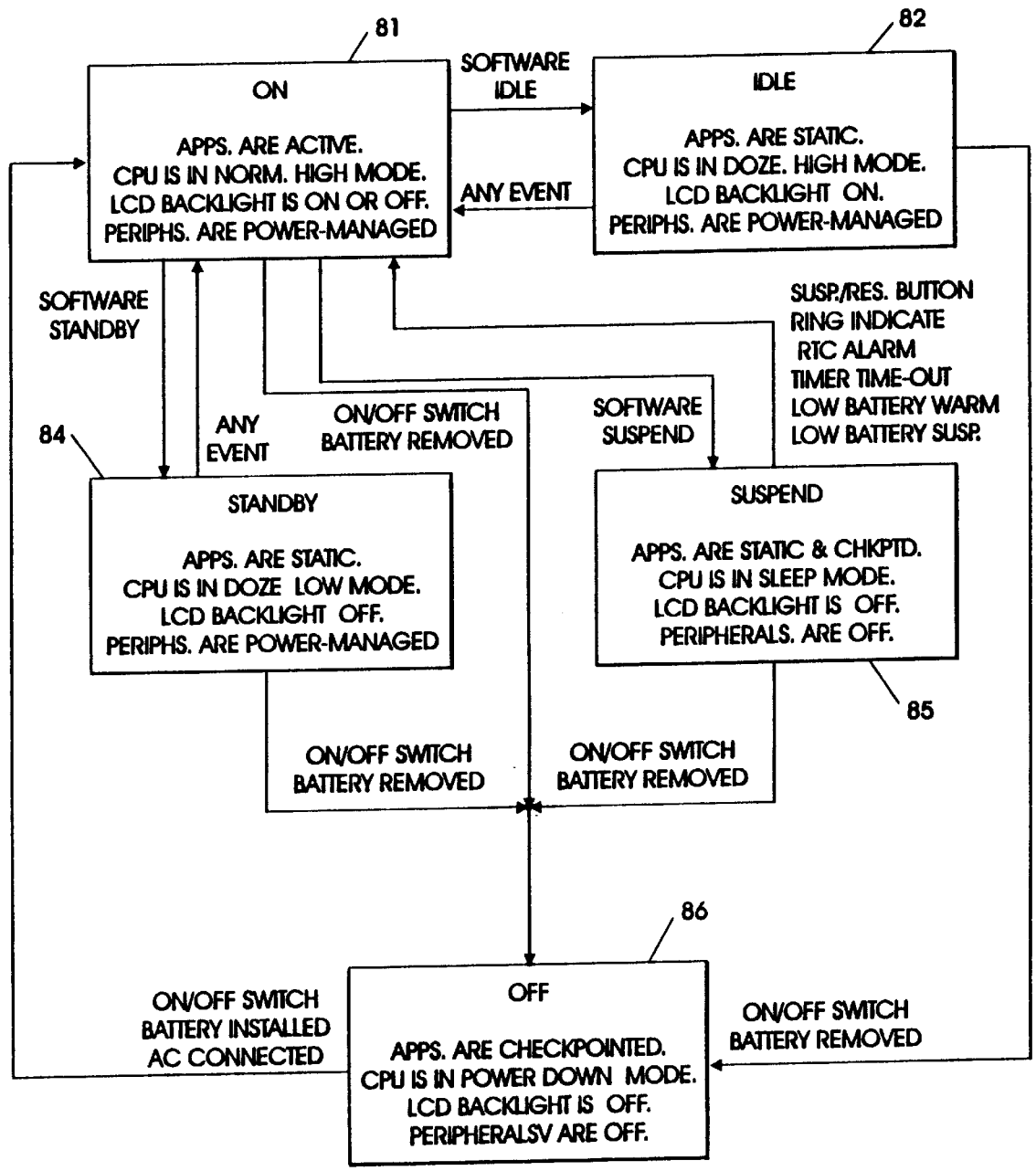
FIG. 7 is a diagram similar to that of FIG. 6 showing the states of certain elements of the mobile client of FIG. 2 and including the status of software executing on the mobile client.

Another view of the power modes and transition events is given in FIG. 7. There, the system states are represented as being an On state 81; Idle state 82; Standby state 84; Suspend state 85; and Off state 86. In the On State 81, the system LEDs and LCD are illuminated, the processor 30 is operating in normal high function mode, application programs are active, and other peripherals are power managed as needed. Passage of time with inactivity will result in the system entering the Idle state 82, in which execution of application programs by the processor has ended, the processor enters a "doze high" mode of power management, the LCD is illuminated, and other peripherals are power managed as needed. Any user event will return the system to the On state. Should the passage of time cause the system to enter the Standby state 84, then application programs become static, the processor enters a "doze low" mode of power management, the LCD is dark, and all other peripherals are power managed as needed. Should the passage of time cause the system to enter the Suspend state 85, application programs become static and are checkpointed for resumption, the processor enters a "sleep" mode of power management, the LCD is darkened, and all other peripherals are off. Thus in terms of time intervals for turnaround to fully active state 81, the system will return most quickly from Idle state 82, less quickly from Standby state 84, less quickly from Suspend state 85, and most slowly from Off state 86.

Figure 8:
FIG. 8 is an illustration of the display screen of the mobile client of FIG. 2 while driven by the execution of an application program on the mobile client to display certain data.

It is now believed instructive to address briefly the display and communication of data as contemplated for the mobile client system of this invention. Referring now more particularly to FIG. 8, there is shown there an exemplary representation of a display screen for an application program executed on the system 10. Preferably, the system 10 executes an application program in the nature of a browser program as used for connection by HyperText Transfer Protocol (HTTP) and for files in HyperText Markup Language (HTML). HTTP and HTML have come into wide use in the environment known as the internet or world wide web. These technologies are here used to facilitate operation of the mobile client system with minimal resources in the client and maximum use of resources available through the supporting server and mainframe data storage. It is to be understood that the present invention is contemplated as having usefulness in any instance where a document constructed using a markup language (of which HTML is but one example) is retrieved from a remote computer system and displayed at a user's system.

Figure 9:
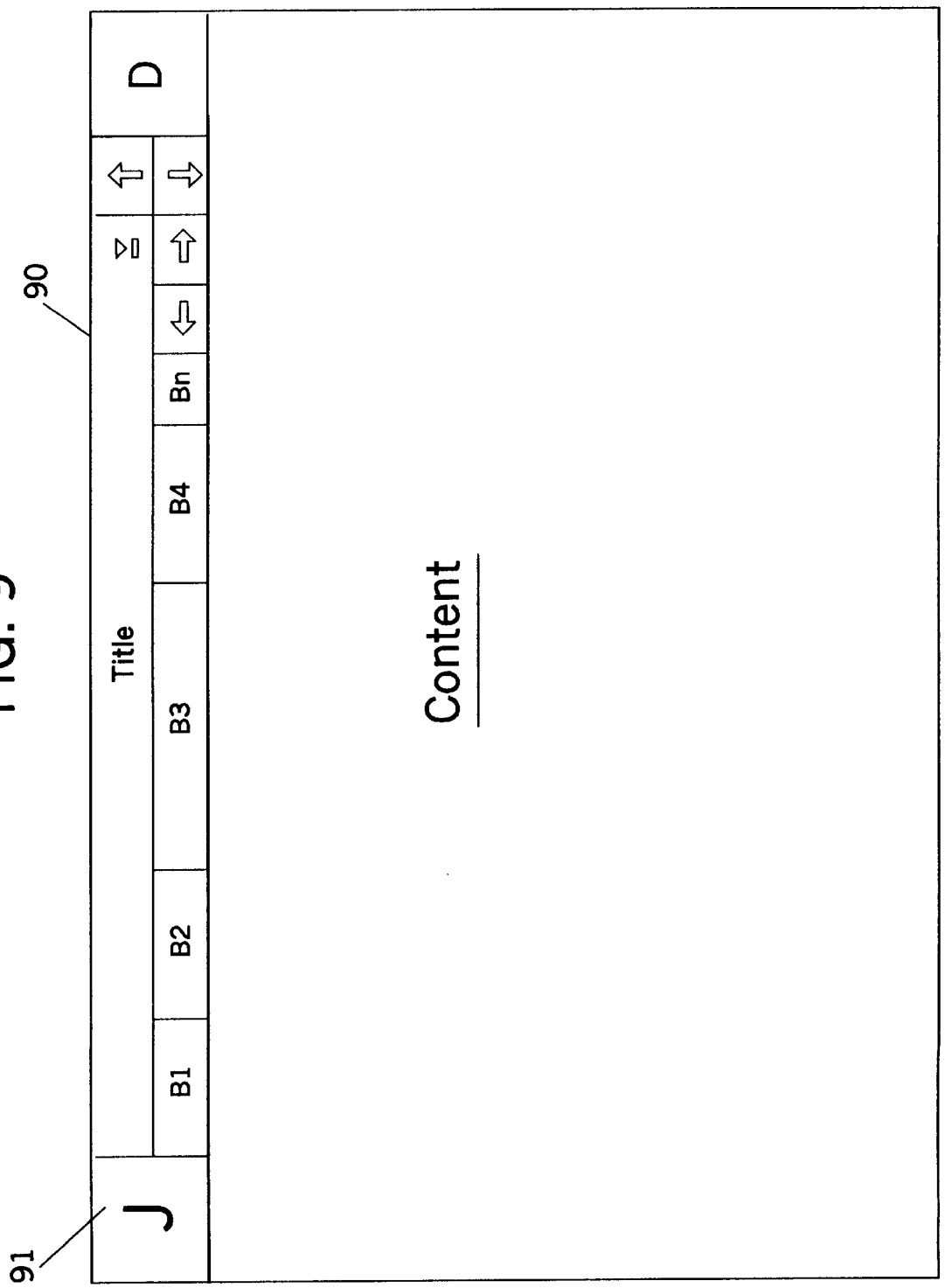
FIG. 9 is a view similar to FIG. 8 illustrating the display of a browser application as contemplated by this invention.

More particularly, the processor 30 of the client system executes digital data in the forms of an operating system program and a browser program stored as application program data in the system flash memory 46. In executing these programs, the system exchanges data with a supporting server by passing data through the radio link provided by the transceiver 13 and interface 58 or the modem 41 if then wire connected. Data so exchanged may be stored for manipulation by the operating system and browser in the system DRAM memory 45. The browser, in conjunction with the data obtained from the supporting server, will display on the LCD 15 screens which may, for example, appear as shown in FIGS. 8 and 9. The screen shown in FIG. 8 has a title bar 90 across the upper limit of the displayed field and, within the displayed field, a form having defined fields for data such as identifying numerals or names. In the specific form illustrated, the fields include a field for a center number, a hospital number, dates of birth and admission of the identified patient, and the like. Adjacent the title bar 90, in an area described below as the J or Jump area, is a representation of an animal, shown at 91 and here illustrated as a kangaroo. This representation is used, in accordance with certain implementations of this invention, to indicate that the system is "jumping" from one data access to another and that a user should await completion of the "jump". There are also provided, immediately below the title bar 90, indications of function "buttons" such as return to the main (or initial) screen, go back one screen, exchange data by wireless link, battery charge state, and navigation about the screen presented. Certain fields, such as the Date of Admission to the ICU and the Class fields, may be annotated by a user, and are so indicated by the positioning adjacent those fields of a "notebook" icon. The notebook may be either closed (as adjacent the Date of Admission field) suggesting that it presently lacks any annotation, or opened (as adjacent the Class field) suggesting that it presently contains an annotation.

Inasmuch as the mobile client system 10 has a touchscreen 50 which overlies the LCD 15, input of data into the system can be accomplished by a stylus, pointer or finger applied to fields of the touchscreen. Thus, referring to FIG. 8, should a user desire to input information identifying the gender of a particular patient, the user could touch (with stylus, pointer or finger) the buttons "male" or "female" to enter that data. Similarly, should a user wish to enter an annotation, the user could touch the field defined by the notebook icon to change the icon between the closed and open states and thereby open a field for entry of appropriate numerical or alphabetic data.

Other and further functions of applications programs and the screen display will become more clear from discussion which follows or appears in the above identified related applications.

Referring now to FIG. 9, the present invention is preferably embodied in an inventive browser application program which addresses the concerns identified in the beginning paragraphs of this description. The problems of a simple user will be discussed first, and then the problem of accommodating multiple display area or screen sizes.

In FIG. 9, a central area of the available display area is available for display of the content of a page constructed using a markup language, such as an HTML document, drawn down from a server, and is labeled, in the Figure, as "Content". What is displayed there will vary with the particular use to which the system, and its associated network, is put. The displayed page may be, for example, a medical form such as shown in FIG. 8. To one side of the central area, shown as the upper side in FIG. 9, are arrayed a number of display elements generated by the browser program and either indicating or permitting certain functions.

One of those functions is accomplished by arrow buttons, shown as having arrowhead shaped display elements pointed in the four cardinal directions of the display (Up, Down, Left, Right), which move elements displayed in the content window in the appropriate direction. This enables display in the content area of less than the entirety of a web page while enabling a user to scan over the entire page by translating the displayed portions of the document upward, downward, left or right. The buttons indicated at B1, B2 through Bn are for those browser functions which the user will require most often. An organization providing the client system and programs stored in the memory of the system (or an advanced user) can configure these buttons to serve selected functions. Examples are shown in the screen display of FIG. 8. Suggested functions include:

Help;

Home;

Back (if a strict hierarchy of hyperlinks is not imposed);

Find (if the system is often used to view reference material);

Jumps to frequently accessed or emergency locations.

For the "simple user," the shaded J, D and Title areas show only status and are indicators, not controls. The J or Jump and D or Document areas are located in corners of the available display area, with the Title area extending along a side edge of the display area therebetween. This organization contributes to simplifying the function/indicator display and maximizing the area available for content, a significant feature on a system having limited display area such as a mobile client system. While this limitation may be less significant in a system having a larger display area, such as a desktop system, the present invention contemplates that the identical display may be provided on a desktop system associated with the same network as a mobile client, in order to achieve consistency in the user interface.

Activity in the J area shows when the system is "jumping" somewhere, i.e., loading a new document (such as an HTML page). The preferred embodiment uses an animated kangaroo image or icon to indicate jumping, as described above. Other possibilities include a spinning globe or any animated picture, a graphical dial showing progress, or textual data showing the percent completed.

The display in the D area shows the "document" position. The preferred embodiment uses a scroll. Other possibilities include a book, a notepad, or a textual page indicator. The proximity of the arrow buttons to the D area helps to associate their functions.

The Title area shows the title of the current document.

For a more advanced or sophisticated user, the shaded areas are controls for command functions as well as indicators.

In such a more sophisticated installation, the J control provides access to browser jump command functions ("Back," "Forward," etc.) and a list of frequently used links. This can be reached, for example, by selecting the J area for action, as by touching the area (if pen input is enabled) or clicking on the area (if mouse input is enabled) to cause a drop down menu listing to temporarily appear. This command functionality is similar to that familiar to many computer users from other application programs.

Similarly, the D control provides access to browser document command functions ("Find," "Reload," etc.), i.e., the functions that operate on the current location without jumping. This includes additional navigational command functions such as moving to various points in the document.

The Title control provides the possibility of typing in the name of a new title or URL as a jump destination command function. It also provides a drop-down list of titles that were used recently, so the user can return to places recently visited.

Some of these more sophisticated J and D functions may appear on the buttons B1 through Bn, depending on how the system is customized.

The advanced features of the browser are hence organized into two categories: jump command functions (under J) and document command functions (under D). An important advantage of this arrangement is that the command functions of the J and D controls (for the advanced user) is an intuitive extension of their functions as indicators (for the simple user). This eases the learning process as a simple user becomes advanced. Also notice that the unique size, shape and location of the J and D areas helps communicate the dichotomy of their functions. That is, the J and D areas are larger than the other areas defined in the display, have a square shape, and are positioned in the "ears" (or corners) of the available display area.

This design is readily scalable to different screen sizes or display areas. It is well-suited to small screens because the ratio of browser indicators and controls displayed to document content displayed is very low. The invention requires only one strip across the top (or some other selected side edge) of the display area for browser widgets, with the rest of the screen being content. If the screen is larger horizontally, there is room for more title information (less title truncation) and more buttons (B1 . . . Bn). If the screen is larger vertically, there is room for more content so the user can see more of the document at once. Hence, while there is a tradeoff between screen size and productivity, the small screen doesn't lose anything that is vital to the operation of the browser.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
   a display device displaying visual images to a human observer, the display device defining a display area;
   a microcontroller coupled to the display device;
   memory devices coupled to the microcontroller and receiving and storing and delivering digitally encoded data used by the microcontroller in executing control programs; and
   digitally encoded application program data stored in the memory devices and effective upon execution by the microcontroller to drive the display on the display device of a markup language document and associated status and command functions;
   the application program data and the microcontroller and the display cooperating when the microcontroller is executing the application program data to display at least a portion of the content of a markup language document in the majority of the display area and to display, along one side edge of the display area, browser jump status, document title information, document display status, and a plurality of selected browser command functions.

2. Apparatus according to claim 1 wherein the application program data and the microcontroller and the display cooperate when the microcontroller is executing the application program data to display, along an upper side edge of the display area, browser jump status, document title information, document display status, and a plurality of selected browser command functions.

3. Apparatus according to claim 1 wherein the application program data and the microcontroller and the display cooperate when the microcontroller is executing the application program data to display an animated icon in one corner of the display area as indicative of browser jump status.

4. Apparatus according to claim 1 wherein the application program data and the microcontroller and the display cooperate when the microcontroller is executing the application program data to display a portion of the content of a markup language document in the majority of the display area and to display, in one corner of the display area, an iconic indication of the location in the document of the content portion then being displayed.

5. Apparatus according to claim 1 wherein the application program data and the microcontroller and the display cooperate when the microcontroller is executing the application program data to display a portion of the content of a markup language document in the majority of the display area and to display, in one corner of the display area, an animated icon indicative of browser jump status and, in an opposite corner of the display area, a location icon indicative of the location in the document of the content portion then being displayed.

6. Apparatus according to claim 5 wherein the application program data and the microcontroller and the display cooperate when the microcontroller is executing the application program data to display the document title information and the plurality of selected browser command functions in an area defined between the animated icon and the location icon.

7. Apparatus according to claim 5 wherein the one corner is the upper left corner of the display area as oriented to the document content displayed.

8. Apparatus according to claim 7 wherein the application program data and the microcontroller and the display cooperate when the microcontroller is executing the application program data to display the document title information and the plurality of selected browser command functions in an area defined between the animated icon and the location icon.

9. Apparatus according to claim 7 wherein the opposite corner is the upper right corner of the display area as oriented to the document content displayed.

10. Apparatus according to claim 9 wherein the application program data and the microcontroller and the display cooperate when the microcontroller is executing the application program data to display the document title information and the plurality of selected browser command functions in an area defined between the animated icon and the location icon.

11. Apparatus according to claim 1 wherein the microcontroller is a microprocessor.

12. Apparatus according to claim 1 wherein the application program data and the microcontroller and the display cooperate when the microcontroller is executing the application program data to enable access to browser jump command functions by selection of an animated icon in one corner of the display area for initiating action.

13. Apparatus according to claim 1 wherein the application program data and the microcontroller and the display cooperate when the microcontroller is executing the application program data to enable access to browser document command functions by selection of a location icon in one corner of the display area for initiating action.

14. Apparatus comprising:
   a display device displaying visual images to a human observer, the display device defining a display area;
   a microprocessor coupled to the display device;
   memory devices coupled to the microprocessor and receiving and storing and delivering digitally encoded data used by the microprocessor in executing control programs; and
   digitally encoded application program data stored in the memory devices and effective upon execution by the microprocessor to drive the display on the display device of a markup language document and associated status and command functions;

the application program data and the microprocessor and the display cooperating when the microprocessor is executing the application program data to display a portion of the content of a markup language document in the majority of the display area and to display:

in one corner of the display area, an animated icon indicative of browser jump status;

in an opposite corner of the display area, a location icon indicative of the location in the document of the content portion then being displayed; and along one side edge of the display area and in an area defined between the animated icon and the location icon, document title information and a plurality of selected browser command functions.

15. Apparatus according to claim 14 wherein the one corner is the upper left corner and the opposite corner is the upper right corner, both as oriented to the document content displayed.

16. Apparatus according to claim 14 wherein the application program data and the microprocessor and the display cooperate when the microprocessor is executing the application program data to enable access to browser jump command functions by selection of an animated icon in one corner of the display area for initiating action.

17. Apparatus according to claim 14 wherein the application program data and the microprocessor and the display cooperate when the microprocessor is executing the application program data to enable access to browser document command functions by selection of a location icon in one corner of the display area for initiating action.

18. A mobile client computer comprising:

a housing sized to be held and manipulated by the hand of a user;

a processor mounted within the housing and processing digital data;

memory mounted within the housing and storing digital data and coupled to the processor;

a display mounted in the housing and coupled to the processor and the memory to define a display area in which information derived from digital data processed by the processor is displayed;

an input digitizer mounted in the housing and overlaying the display, the digitizer being coupled to the processor for input of digital data by a user; and a browser program stored in the memory and accessible by the processor for directing the processing of digital data by the processor, the browser program and the processor and the display cooperating when the processor is executing the browser program to display at least a portion of the content of a markup language document in the majority of the display area and to display, along one side edge of the display area, browser jump status, document title information, document display status, and a plurality of selected browser command functions.

19. A computer according to claim 18 wherein the browser and the processor and the display cooperate when the processor is executing the browser program to display, along an upper side edge of the display area, browser jump status, document title information, document display status, and a plurality of selected browser command functions.

20. A computer according to claim 18 wherein the browser program and the processor and the display cooperate when the processor is executing the browser program to display an animated icon in one corner of the display area as indicative of browser jump status.

21. A computer according to claim 18 wherein the browser program and the processor and the display cooperate when the processor is executing the browser program to display a portion of the content of a markup language document in the majority of the display area and to display, in one corner of the display area, an iconic indication of the location in the document of the content portion then being displayed.

22. A computer according to claim 18 wherein the browser program and the processor and the display cooperate when the processor is executing the browser program to display a portion of the content of a markup language document in the majority of the display area and to display, in one corner of the display area, an animated icon indicative of browser jump status and, in an opposite corner of the display area, a location icon indicative of the location in the document of the content portion then being displayed.

23. A computer according to claim 22 wherein the browser program and the processor and the display cooperate when the processor is executing the browser program to display the document title information and the plurality of selected browser command functions in an area defined between the animated icon and the location icon.

24. A computer according to claim 22 wherein the one corner is the upper left corner of the display area as oriented to the document content displayed.

25. A computer according to claim 24 wherein the browser program and the processor and the display cooperate when the processor is executing the browser program to display the document title information and the plurality of selected browser command functions in an area defined between the animated icon and the location icon.

26. A computer according to claim 24 wherein the opposite corner is the upper right corner of the display area as oriented to the document content displayed.

27. A computer according to claim 26 wherein the browser program and the processor and the display cooperate when the processor is executing the browser program to display the document title information and the plurality of selected browser command functions in an area defined between the animated icon and the location icon.

28. A computer according to claim 18 wherein the browser program and the processor and the display cooperate when the processor is executing the browser program to enable access to browser jump command functions by selection of an animated icon in one corner of the display area for initiating action.

29. A computer according to claim 18 wherein the browser program and the processor and the display cooperate when the processor is executing the browser program to enable access to browser document command functions by selection of a location icon in one corner of the display area for initiating action.

30. A mobile client computer comprising:

a housing sized to be held and manipulated by the hand of a user;

a processor mounted within the housing and processing digital data;

memory mounted within the housing and storing digital data and coupled to the processor;

a display mounted in the housing and coupled to the processor and the memory to define a display area in which information derived from digital data processed by the processor is displayed;

an input digitizer mounted in the housing and overlaying the display, the digitizer being coupled to the processor for input of digital data by a user; and a browser program stored in the memory and accessible by the processor for directing the processing of digital data by the processor, the browser program and the processor and the display cooperating when the processor is executing the browser program the browser program and the processor and the display cooperating when the processor is executing the browser program to display a portion of the content of a markup language document in the majority of the display area and to display:

in one corner of the display area, an animated icon indicative of browser jump status;

in an opposite corner of the display area, a location icon indicative of the location in the document of the content portion then being displayed; and along one side edge of the display area and in an area defined between the animated icon and the location icon, document title information and a plurality of selected browser command functions.

31. A computer according to claim 30 wherein the one corner is the upper left corner and the opposite corner is the upper right corner, both as oriented to the document content displayed.

32. A computer according to claim 30 wherein the browser program and the processor and the display cooperate when the processor is executing the application program data to enable access to browser jump command functions by selection of an animated icon in one corner of the display area for initiating action.

33. A computer according to claim 30 wherein the browser program and the processor and the display cooperate when the processor is executing the browser program to enable access to browser document command functions by selection of a location icon in one corner of the display area for initiating action.

* * * * *